United States Patent
Han

(10) Patent No.: US 12,222,787 B2
(45) Date of Patent: Feb. 11, 2025

(54) SERVER FIRMWARE SELF-RECOVERY SYSTEM AND SERVER

(71) Applicant: SHANDONG YINGXIN COMPUTER TECHNOLOGIES CO., LTD., Shandong (CN)

(72) Inventor: Hongrui Han, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 72 days.

(21) Appl. No.: 18/024,809

(22) PCT Filed: Sep. 28, 2021

(86) PCT No.: PCT/CN2021/121423
§ 371 (c)(1),
(2) Date: Mar. 6, 2023

(87) PCT Pub. No.: WO2022/198973
PCT Pub. Date: Sep. 29, 2022

(65) Prior Publication Data
US 2023/0333621 A1    Oct. 19, 2023

(30) Foreign Application Priority Data

Mar. 26, 2021   (CN) ......................... 202110326283.9

(51) Int. Cl.
*G06F 1/30* (2006.01)
(52) U.S. Cl.
CPC ...................................... *G06F 1/30* (2013.01)
(58) Field of Classification Search
CPC ....................................................... G06F 1/30
See application file for complete search history.

(56) References Cited

U.S. PATENT DOCUMENTS

| 8,104,031 B2 | 1/2012 | Kai |
| 11,222,120 B2 * | 1/2022 | Lip Vui ................. H04L 9/08 |

(Continued)

FOREIGN PATENT DOCUMENTS

| CN | 1523509 A | 8/2004 |
| CN | 102200933 A | 9/2011 |

(Continued)

OTHER PUBLICATIONS

Corresponding International Patent Application No. PCT/CN2021/121423, International Search Report, date mailed Dec. 30, 2021.

(Continued)

*Primary Examiner* — Nadeem Iqbal
(74) *Attorney, Agent, or Firm* — Cooper Legal Group, LLC

(57) ABSTRACT

A server firmware self-recovery system and a server. The system includes a storage module, a starting controller, a repair controller, and a logic controller. The storage module is configured to store a system firmware program. The starting controller is configured to read, when establishing a communication connection with the storage module, the system firmware program from the storage module to start the system. The repair controller is configured to perform abnormality repair processing on the storage module when the storage module starts abnormally and the repair controller establishes a communication connection with the storage module. The logic controller is configured to establish a communication connection between the storage module and the starting controller by default in an initial situation. If the starting controller fails to start the system, the storage module starts abnormally, and the storage module is switched to establish a communication connection with the repair controller.

18 Claims, 8 Drawing Sheets

(56) References Cited

U.S. PATENT DOCUMENTS

2013/0212430 A1    8/2013  Deng et al.
2016/0357649 A1*  12/2016  Karrotu .............. G06F 11/2087

FOREIGN PATENT DOCUMENTS

| | | | |
|---|---|---|---|
| CN | 102722423 | A | 10/2012 |
| CN | 101916216 | A | 11/2012 |
| CN | 103246579 | A | 8/2013 |
| CN | 108304299 | A | 7/2018 |
| CN | 109446012 | A | 3/2019 |
| CN | 109992316 | A | 7/2019 |
| CN | 111143132 | A | 5/2020 |
| CN | 113064757 | A | 7/2021 |

OTHER PUBLICATIONS

Corresponding International Patent Application No. PCT/CN2021/121423, Written Opinion, date mailed Dec. 30, 2021.
Corresponding Chinese Patent Application No. CN202110326283.9, First Office Action dated Jun. 30, 2022.

* cited by examiner

SERVER FIRMWARE SELF-RECOVERY SYSTEM AND SERVER

This application claims priority to Chinese Patent Application No. 202110326283.9, filed on Mar. 26, 2021 in China National Intellectual Property Administration and entitled "Server Firmware Self-Recovery System and Server", which is hereby incorporated by reference in its entirety.

FIELD

The present application relates to a field of server operation and maintenance, in particular to a server firmware self-recovery system and a server.

BACKGROUND

With increasing size of data centers, tens of millions of servers bring great challenges to operation and maintenance work. Currently, a firmware program of a server system is usually stored in a flash chip, and the system is started by reading the firmware program in the flash chip. However, the system sometimes fails to start due to problems in the flash chip or the firmware program thereof, but the existing operation and maintenance work may only report a system starting failure situation to an operation and maintenance server, and maintenance personnel are required to perform abnormality repair processing on the flash chip subsequently, resulting in a longer operation and maintenance time, lower operation and maintenance efficiency, and higher operation and maintenance work pressure.

Therefore, how to provide a solution for solving a foregoing technical problem is a problem to be currently solved by those skilled in the art.

SUMMARY

An object of the present application is to provide a server firmware self-recovery system and a server. The starting abnormality of a storage module may be repaired, thereby reducing operation and maintenance time, improving operation and maintenance efficiency, and reducing operation and maintenance work pressure.

To solve the foregoing technical problem, the present application provides a server firmware self-recovery system, including:
  a storage module, configured to store a system firmware program;
  a starting controller, configured to read, when establishing a communication connection with the storage module, the system firmware program from the storage module so as to start a system;
  a repair controller, configured to automatically perform abnormality repair processing on the storage module when the storage module starts abnormally and the repair controller establishes a communication connection with the storage module; and
  a logic controller, connected to the storage module, the starting controller and the repair controller respectively, and configured to establish a communication connection between the storage module and the starting controller by default in an initial situation, determine that the storage module starts abnormally if detecting that the starting controller fails to start the system, and switch the storage module to establish a communication connection with the repair controller.

In some embodiments, the starting controller includes a management engine (ME), and the system firmware program includes an ME firmware program.

Accordingly, the starting controller is configured to read, when establishing a communication connection with the storage module, the ME firmware program from the storage module so as to run the ME, and generate a power-on starting status signal using the ME after receiving a power key signal.

The logic controller is configured to receive the power key signal of the system and send the power key signal to the starting controller, judge whether the power-on starting status signal returned by the starting controller is received within a preset time, control system hardware to be powered on so as to start the system if yes, determine that the storage module starts abnormally if not, and switch the storage module to establish a communication connection with the repair controller.

In some embodiments, the logic controller includes:
  a detection module connected to the starting controller, configured to send a status signal timeout result to a control module if the power-on starting status signal returned by the starting controller is not received within the preset time after the power key signal is sent to the starting controller;
  a gating module including a first gating end connected to the storage module, a first transmission end connected to the starting controller, and a second transmission end connected to the repair controller;
  a second communication module connected to a first communication module in the repair controller;
  a status register connected to the second communication module; and
  the control module connected to the detection module, the second communication module, the status register, and the gating module respectively, and configured to control the gating module to connect the first gating end with the first transmission end by default in the initial situation, determine that the storage module starts abnormally after receiving the status signal timeout result, and record a starting abnormality situation and reason of the storage module to the status register.

Accordingly, the repair controller is further configured to poll the status register through a communication module, and control the gating module to switch the first gating end to be connected with the second transmission end through communication with the control module when a starting abnormality situation of the storage module is queried, so as to automatically perform the abnormality repair processing on the storage module based on a queried starting abnormality reason of the storage module.

In some embodiments, the logic controller further includes:
  a status memory module connected to the control module, configured to store a latest gating status of the gating module, where a gating status of the gating module initially defaulted by the status memory module is that the first gating end is connected with the first transmission end.

The control module is further configured to read a last gating status of the gating module from the status memory module after a system alternating current (AC) is powered on and the control module starts to work, and control the gating module to maintain the last gating status.

In some embodiments, the storage module includes a main storage module and a standby storage module both storing the system firmware program.

Accordingly, the logic controller is configured to establish a communication connection between the main storage module and the starting controller by default in the initial situation, determine that the main storage module starts abnormally if detecting that the starting controller fails to start the system, switch the main storage module to establish a communication connection with the repair controller, and establish a communication connection between the standby storage module and the starting controller, whereby the starting controller restarts the system.

In some embodiments, the logic controller is further configured to determine that the standby storage module starts abnormally if detecting that the starting controller fails to restart the system after establishing a communication connection between the standby storage module and the starting controller.

Accordingly, the repair controller is configured to automatically perform the abnormality repair processing on the main storage module when the main storage module starts abnormally and the standby storage module works normally, and sequentially perform the abnormality repair processing on the main storage module and the standby storage module when the main storage module and the standby storage module starts abnormally.

In some embodiments, a process of the performing the abnormality repair processing on the main storage module includes:
  judging whether a power supply voltage of the main storage module is normal;
  if the power supply voltage is abnormal, determining that the surrounding circuit of the main storage module is abnormal;
  if the power supply voltage is normal, determining that a surrounding circuit of the main storage module is normal, and judging whether the main storage module is normally accessible;
  if the main storage module is not normally accessible, determining that the main storage module is damaged;
  if the main storage module is normally accessible, determining that the main storage module is normal, and judging whether the ME firmware program in the main storage module is readable;
  if the ME firmware program is not readable, determining that the main storage module lacks the ME firmware program, rewriting the backed-up ME firmware program to the main storage module for automatic repair, and switching the main storage module back to reestablish a communication connection with the starting controller;
  if the ME firmware program is readable, verifying the ME firmware program in the main storage module, if a verification fails, determining that the ME firmware program in the main storage module is damaged, rewriting the backed-up ME firmware program to the main storage module for the automatic repair, and switching the main storage module back to reestablish a communication connection with the starting controller;
  if the main storage module still starts abnormally, determining that the ME has a fault.

In some embodiments, a process of the sequentially performing the abnormality repair processing on the main storage module and the standby storage module includes:
  judging whether a power supply voltage of the main storage module is normal;
  if the power supply voltage is abnormal, determining that a surrounding circuit of the main storage module is abnormal;
  if the power supply voltage is normal, determining that the surrounding circuit of the main storage module is normal, and judging whether the main storage module is normally accessible;
  if the main storage module is not normally accessible, determining that the main storage module is damaged;
  if the main storage module is normally accessible, determining that the main storage module is normal, and judging whether the ME firmware program in the main storage module is readable;
  if the ME firmware program is not readable, determining that the main storage module lacks the ME firmware program, rewriting a backed-up ME firmware program to the main storage module for automatic repair, controlling, after a writing is completed, the logic controller to switch the main storage module back to establish a communication connection with the starting controller, controlling the starting controller to restart the system, and judging whether the system is normally restartable; if the system is normally restartable, directly rewriting the backed-up ME firmware program to the standby storage module again, controlling, after the writing is completed, the logic controller to switch the standby storage module back to establish a communication connection with the starting controller, controlling the starting controller to restart the system, and judging whether the system is normally restartable; if the system is normally restartable, determining that the main storage module and the standby storage module have been repaired;
  if the ME firmware program is readable, verifying the ME firmware program in the main storage module, if the verification fails, determining that the ME firmware program in the main storage module is damaged, rewriting the backed-up ME firmware program to the main storage module for the automatic repair, controlling, after the writing is completed, the logic controller to switch the main storage module back to establish a communication connection with the starting controller, controlling the starting controller to restart the system, and judging whether the system is normally restartable; if the system is normally restartable, directly rewriting a backed-up ME firmware program to the standby storage module again, controlling, after the writing is completed, the logic controller to switch the standby storage module back to establish a communication connection with the starting controller, controlling the starting controller to restart the system, and judging whether the system is normally restartable; if the system is normally restartable, determining that the main storage module and the standby storage module have been repaired;
  if the restarting of the system is abnormal, determining that the ME has a fault.

In some embodiments, the system firmware program further includes a basic input output system (BIOS) firmware program, and the starting controller is connected to the repair controller.

The starting controller is further configured to read, after the system power-on is completed, the BIOS firmware program from the storage module to start a BIOS.

The repair controller is further configured to perform BIOS starting abnormality judgment when the starting controller starts the BIOS, and automatically perform BIOS firmware program abnormality repair processing on the storage module when the BIOS starts abnormally due to a problem in the BIOS firmware program.

In some embodiments, the starting controller is a central processing unit (CPU), the repair controller is a baseboard management controller (BMC), and the logic controller is a complex programmable logic device (CPLD).

To solve the foregoing technical problem, the present application also provides a server, including the server firmware self-recovery system according to any of the foregoing.

The present application provides a server firmware self-recovery system, including a storage module, a starting controller, a repair controller, and a logic controller. The storage module is configured to store a system firmware program. The starting controller is configured to read, when establishing a communication connection with the storage module, the system firmware program from the storage module so as to start the system. The repair controller is configured to automatically perform abnormality repair processing on the storage module when the storage module starts abnormally and the repair controller establishes a communication connection with the storage module. The logic controller is configured to establish a communication connection between the storage module and the starting controller by default in an initial situation, determine that the storage module starts abnormally if detecting that the starting controller fails to start the system, and switch the storage module to establish a communication connection with the repair controller. It may be seen that the present application may automatically repair the starting abnormality of a storage module, thereby reducing operation and maintenance time, improving operation and maintenance efficiency, and reducing operation and maintenance work pressure.

The present application also provides a server having the same advantageous effects as the foregoing firmware self-recovery system.

BRIEF DESCRIPTION OF THE DRAWINGS

To describe technical solutions in embodiments of the present application more clearly, following briefly describes accompanying drawings required in the prior art and the embodiments. Obviously, the drawings in following description show merely some embodiments of this application, and those of ordinary skill in the art may derive other drawings from these drawings without creative efforts.

DETAILED DESCRIPTION

A core of the present application is to provide a server firmware self-recovery system and a server. A starting abnormality of a storage module may be repaired, thereby reducing operation and maintenance time, improving operation and maintenance efficiency, and reducing operation and maintenance work pressure.

In order that the objects, technical solutions and advantages of the embodiments of the present application will become more apparent, the technical solutions in the embodiments of the present application will now be described clearly and completely with reference to accompanying drawings in the embodiments of the present application. It is obvious that the described embodiments are merely some, but not all, embodiments of the present application. Based on the embodiments of the present application, all other embodiments obtained by those of ordinary skill in the art without creative work shall fall within the protection scope of the present application.

Figure 1:
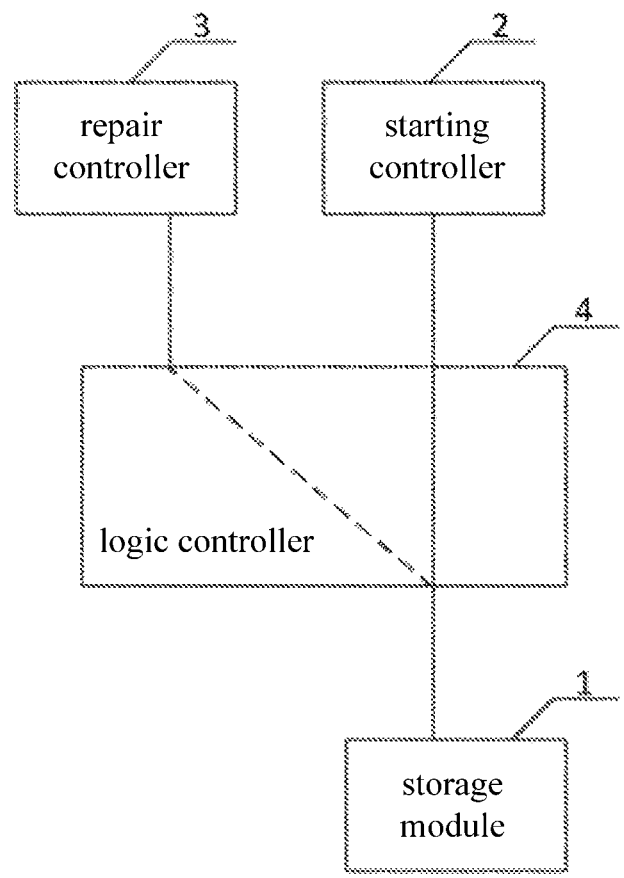
FIG. 1 is a schematic structural diagram of a server firmware self-recovery system according to an embodiment of the present application.

Please refer to FIG. 1. FIG. 1 is a schematic structural diagram of a server firmware self-recovery system according to an embodiment of the present application.

The server firmware self-recovery system includes:
a storage module 1, configured to store a system firmware program;
a starting controller 2, configured to read, when establishing a communication connection with the storage module 1, the system firmware program from the storage module 1 so as to start a system;
a repair controller 3, configured to automatically perform abnormality repair processing on the storage module 1 when the storage module 1 starts abnormally and the repair controller establishes a communication connection with the storage module 1; and
a logic controller 4, connected to the storage module 1, the starting controller 2 and the repair controller 3 respectively, and configured to establish a communication connection between the storage module 1 and the starting controller 2 by default in an initial situation, determine that the storage module 1 starts abnormally if detecting that the starting controller 2 fails to start the system, and switch the storage module 1 to establish a communication connection with the repair controller 3.

In some embodiments, the server firmware self-recovery system of the present application includes the storage module 1, the starting controller 2, the repair controller 3, and the logic controller 4. A working principle thereof is:

The storage module 1 is configured to store the system firmware program. The logic controller 4 establishes a communication connection between the storage module 1 and the starting controller 2 by default in the initial situation. The starting controller 2 reads, when establishing a communication connection with the storage module, the system firmware program from the storage module 1 so as to start the system. The logic controller 4 detects a situation in which the starting controller 2 starts the system, determines that the storage module 1 starts abnormally if detecting that the starting controller 2 fails to start the system, and switches the storage module 1 to establish a communication connection with the repair controller 3. The repair controller 3 automatically performs the abnormality repair processing on the storage module 1 when the storage module 1 starts abnormally and the repair controller establishes a communication connection with the storage module 1.

It may be seen that the present application may automatically repair the starting abnormality of the storage module 1, thereby reducing operation and maintenance time, improving operation and maintenance efficiency, and reducing operation and maintenance work pressure.

Figure 2:
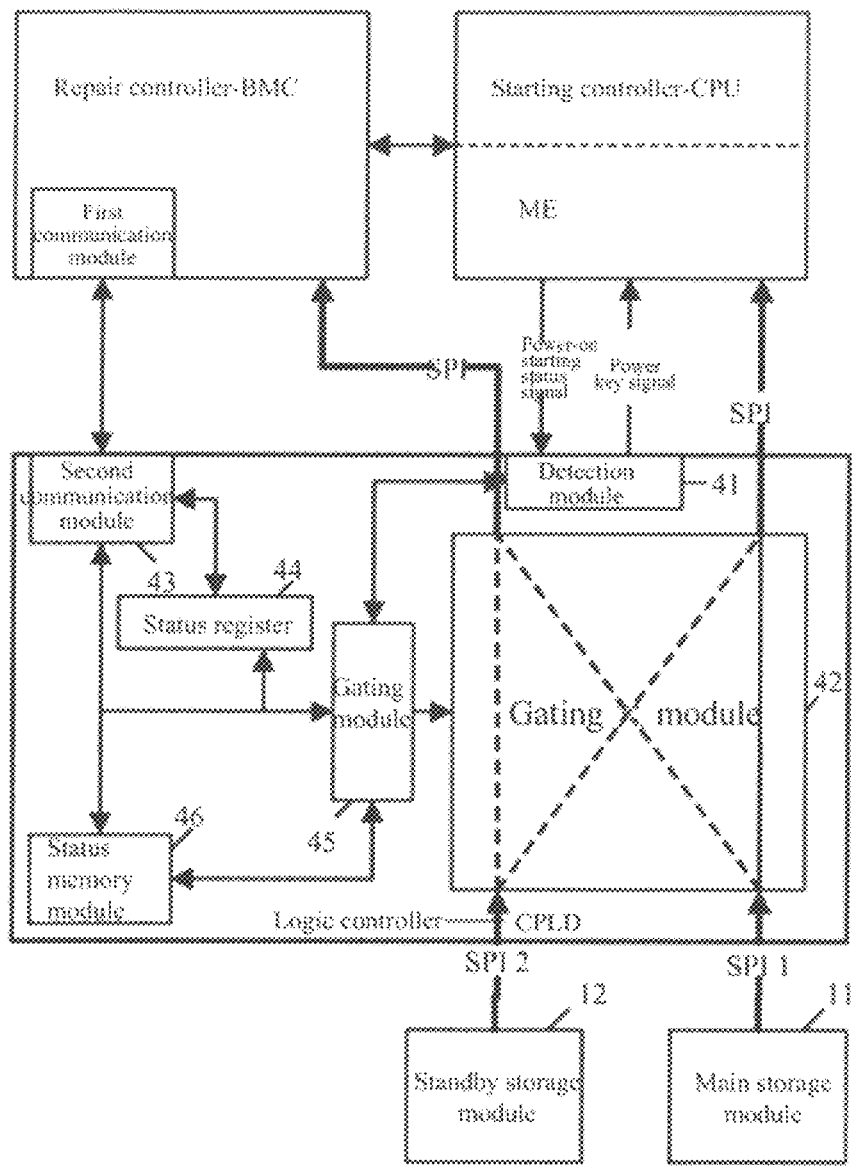
FIG. 2 is a schematic structural diagram of the server firmware self-recovery system according to an embodiment of the present application.

On the basis of foregoing embodiments:

Please refer to FIG. 2. FIG. 2 is a schematic structural diagram of the server firmware self-recovery system according to an embodiment of the present application.

In some embodiments, the starting controller 2 includes a management engine (ME), and the system firmware program includes an ME firmware program.

Accordingly, the starting controller 2 is configured to read, when establishing a communication connection with the storage module 1, the ME firmware program from the storage module 1 so as to run the ME, and generate a power-on starting status signal using the ME after receiving a power key signal.

The logic controller 4 is configured to receive the power key signal of the system and send the power key signal to the starting controller 2, judge whether the power-on starting status signal returned by the starting controller 2 is received within a preset time, control system hardware to be powered on so as to start the system if the power-on starting status signal is received, determine that the storage module 1 starts abnormally if the power-on starting status signal is not received, and switch the storage module 1 to establish a communication connection with the repair controller 3.

In some embodiments, the starting controller 2 of the present application includes the ME, and the system firmware program includes the ME firmware program. Based on this, the working principle of the starting controller 2 and the logic controller 4 is:

When a power key of a server system is pressed or the server system receives a power-on command that is sent remotely, a level of the power key signal changes, and the power key signal is sent to the logic controller 4 at this moment. The logic controller 4 sends the power key signal to the starting controller 2 after receiving the power key signal of the system. The starting controller 2 reads, when establishing a communication connection with the storage module 1, the ME firmware program from the storage module 1 so as to run the ME, and generates a power-on starting status signal (S3 status signal) using the ME after receiving the power key signal.

Considering that if the ME of the starting controller 2 runs abnormally (equivalent to that the storage module 1 starts abnormally), the starting controller 2 cannot send the power-on starting status signal. A corresponding phenomenon is that the system cannot be started, namely, the starting controller 2 fails to start the system. Therefore, the logic controller 4 starts timing from sending the power key signal to the starting controller 2, and judges whether the starting controller 2 sends a power-on starting status signal when the timing time reaches a preset time T0 (such as 5s). If the starting controller 2 sends the power-on starting status signal within a specified time T0, it is determined that the ME of the starting controller 2 runs normally. If the starting controller 2 does not send the power-on starting status signal within a specified time T0, it is determined that the ME of the starting controller 2 runs abnormally and that the storage module 1 starts abnormally, and the storage module 1 is switched to establish a communication connection with the repair controller 3, whereby the repair controller 3 automatically performs the abnormality repair processing on the storage module 1.

In some embodiments, the logic controller 4 includes:

a detection module 41 connected to the starting controller 2, configured to send a status signal timeout result to a control module 45 if the power-on starting status signal returned by the starting controller 2 is not received within the preset time after the power key signal is sent to the starting controller 2;

a gating module 42 including a first gating end connected to the storage module 1, a first transmission end connected to the starting controller 2, and a second transmission end connected to the repair controller 3;

a second communication module 43 connected to a first communication module in the repair controller 3;

a status register 44 connected to the second communication module 43; and the control module 45 connected to the detection module 41, the second communication module 43, the status register 44, and the gating module 42 respectively, and configured to control the gating module 42 to connect the first gating end with the first transmission end by default in the initial situation, determine that the storage module 1 starts abnormally after receiving the status signal timeout result, and record a starting abnormality situation and reason of the storage module 1 to the status register 44.

Accordingly, the repair controller 3 is further configured to poll the status register 44 through a communication module, and control the gating module 42 to switch the first gating end to be connected with the second transmission end through communication with the control module 45 when a starting abnormality situation of the storage module 1 is queried, so as to automatically perform the abnormality repair processing on the storage module 1 based on a queried starting abnormality reason of the storage module 1.

In some embodiments, the logic controller 4 of the present application includes the detection module 41, the gating module 42, the second communication module 43, the status register 44, and the control module 45. The working principle thereof is:

The control module 45 controls the gating module 42 to connect the first gating end with the first transmission end by default in the initial situation, namely, establishes a communication connection between the storage module 1 and the starting controller 2 by default in the initial situation. When the power key of the server system is pressed or the server system receives the power-on command that is sent remotely, the level of the power key signal changes, and the power key signal is sent to the control module 45 of the logic controller 4 at this moment. The control module 45 sends the power key signal to the starting controller 2 via the detection module 41. The starting controller 2 reads, when establishing a communication connection with the storage module 1, the ME firmware program from the storage module 1 so as to run the ME, and generates the power-on starting status signal using the ME after receiving the power key signal.

The detection module 41 starts timing from sending the power key signal to the starting controller 2, and judges whether the starting controller 2 sends the power-on starting status signal when the timing time reaches the preset time T0. If the starting controller 2 sends the power-on start status signal within the specified time T0, it is determined that the power-on starting status signal has not timed out. If the starting controller 2 does not send the power-on starting status signal within the specified time T0, it is determined that the power-on starting status signal times out, and the status signal timeout result is sent to the control module 45.

The control module 45 determines that the storage module 1 starts abnormally after receiving the status signal timeout result, and records the starting abnormality situation and a starting abnormality reason (for example, status signal timeout) of the storage module 1 to the status register 44. The repair controller 3 may poll (for example, 2s) the status register 44 through the communication module, and control the gating module 42 to switch the first gating end to be connected with the second transmission end through communication with the control module 45 when the starting abnormality situation of the storage module 1 is queried from the status register 44. That is, the storage module 1 is switched to establish a communication connection with the repair controller 3, whereby the repair controller 3 automatically performs the abnormality repair processing on the storage module 1 based on the queried starting abnormality reason of the storage module 1 from the status register 44.

In some embodiments, the logic controller 4 further includes:
a status memory module 46 connected to the control module 45, configured to store a latest gating status of the gating module 42, where a gating status of the gating module 42 initially defaulted by the status memory module 46 is that the first gating end is connected with the first transmission end.

The control module 45 is further configured to read a last gating status of the gating module 42 from the status memory module 46 after a system alternating current (AC) is powered on and the control module starts to work, and control the gating module 42 to maintain the last gating status.

Further, the logic controller 4 of the present application further includes the status memory module 46. The working principle thereof is:

The status memory module 46 is configured to store a least gating status of the gating module 42. The control module 45 starts to work after the system AC is powered on: reading the last gating status of the gating module 42 from the status memory module 46, and then controlling the gating module 42 to maintain the last gating status, so as to recover the latest gating status of the gating module 42 before the system is powered off. It should be noted that a gating status of the gating module 42 initially defaulted by the status memory module 46 is that the first gating end is connected with the first transmission end, whereby the control module 45 reads the gating status of the gating module 42 initially defaulted from the status memory module 46, so as to control the gating module 42 to connect the first gating end with the first transmission end, namely, establish a communication connection between the storage module 1 and the starting controller 2 by default in the initial situation.

Furthermore, the status memory module 46 may be connected to the second communication module 43, whereby the repair controller 3 may query the latest gating status of the gating module 42 from the status memory module 46. The status memory module 46 of the present application adopts a non-transitory memory, and the status register 44 adopts a transitory memory.

In some embodiments, the storage module 1 includes a main storage module 11 and a standby storage module 12 both storing the system firmware program.

Accordingly, the logic controller 4 is configured to establish a communication connection between the main storage module 11 and the starting controller 2 by default in the initial situation, determine that the main storage module 11 starts abnormally if detecting that the starting controller 2 fails to start the system, switch the main storage module 11 to establish a communication connection with the repair controller 3, and establish a communication connection between the standby storage module 12 and the starting controller 2, whereby the starting controller 2 restarts the system.

In some embodiments, there are two storage modules in the present application, namely, the main storage module 11 and the standby storage module 12. The working principle thereof is:

The logic controller 4 establishes a communication connection between the main storage module 11 and the starting controller 2 by default in an initial situation. The starting controller 2 reads, when establishing a communication connection with the main storage module 11, a system firmware program from the storage module 11 so as to start the system. The logic controller 4 detects the situation in which the starting controller 2 starts the system, determines that the main storage module 11 starts abnormally if detecting that the starting controller 2 fails to start the system, switches the main storage module 11 to establish a communication connection with the repair controller 3 (for detailed working principle, reference may be made to the foregoing embodiments), and establishes a communication connection between the standby storage module 12 and the starting controller 2, whereby the starting controller 2 restarts the system.

Figure 3:
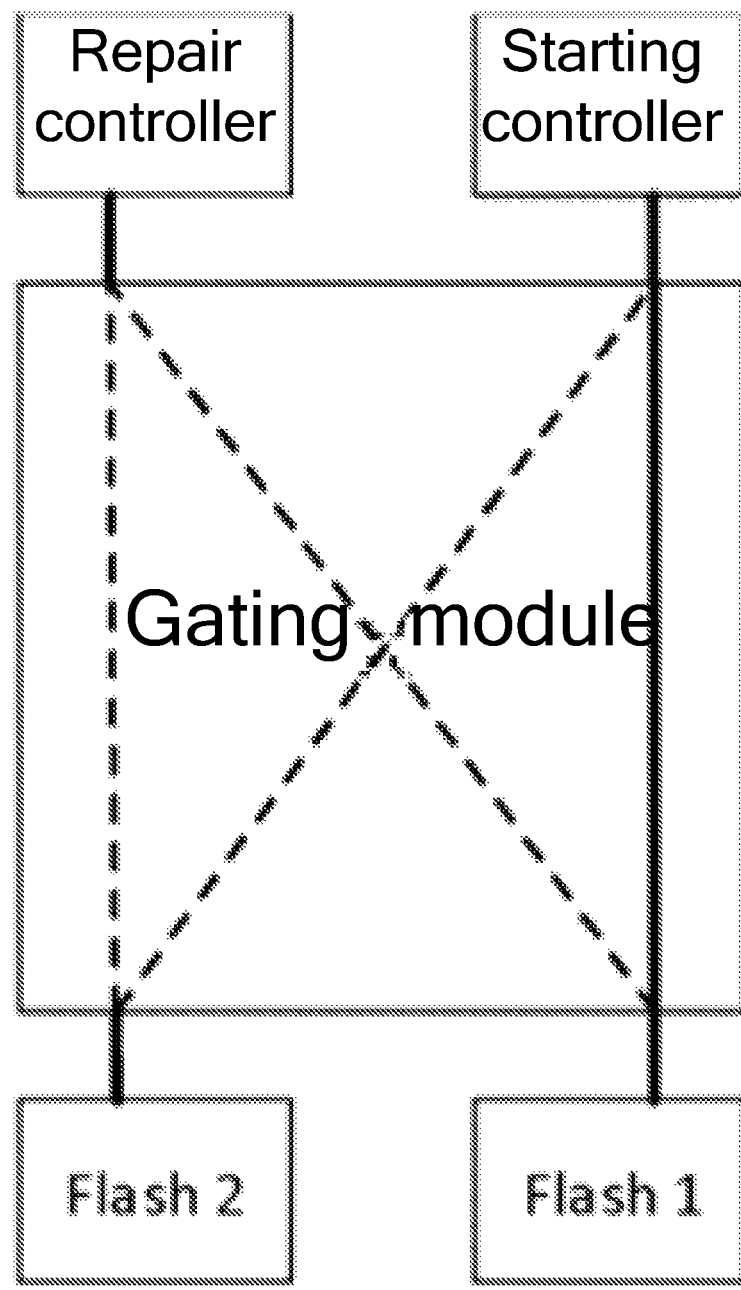
FIG. 3 is a schematic diagram of a first connection structure of a gating module according to an embodiment of the present application.
Figure 4:
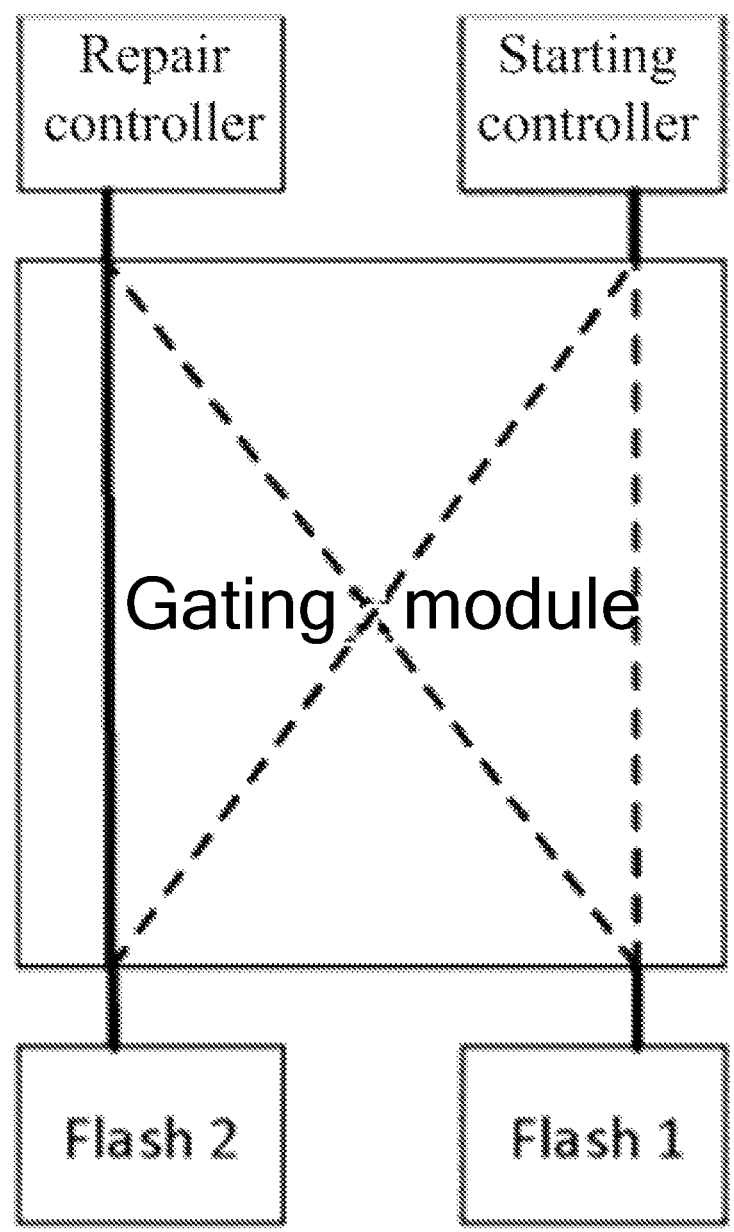
FIG. 4 is a schematic diagram of a second connection structure of the gating module according to an embodiment of the present application.
Figure 5:
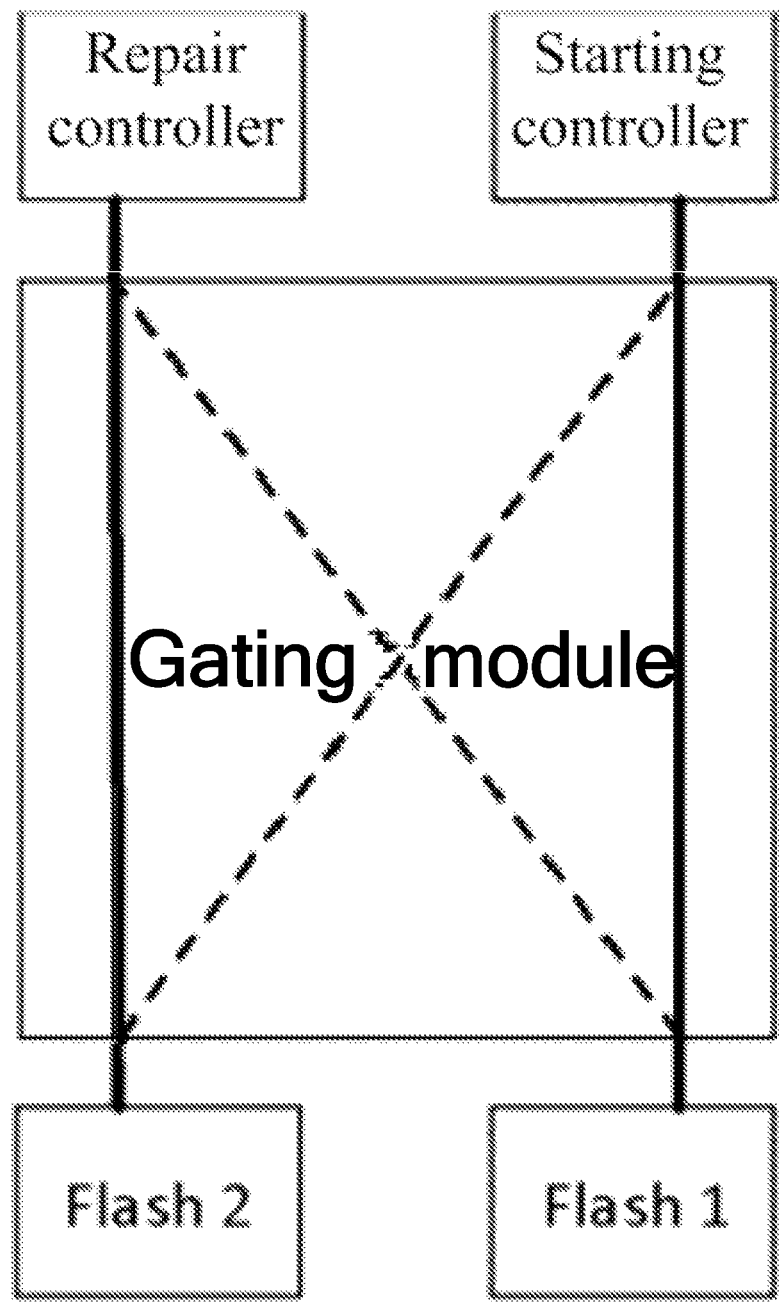
FIG. 5 is a schematic diagram of a third connection structure of the gating module according to an embodiment of the present application.
Figure 6:
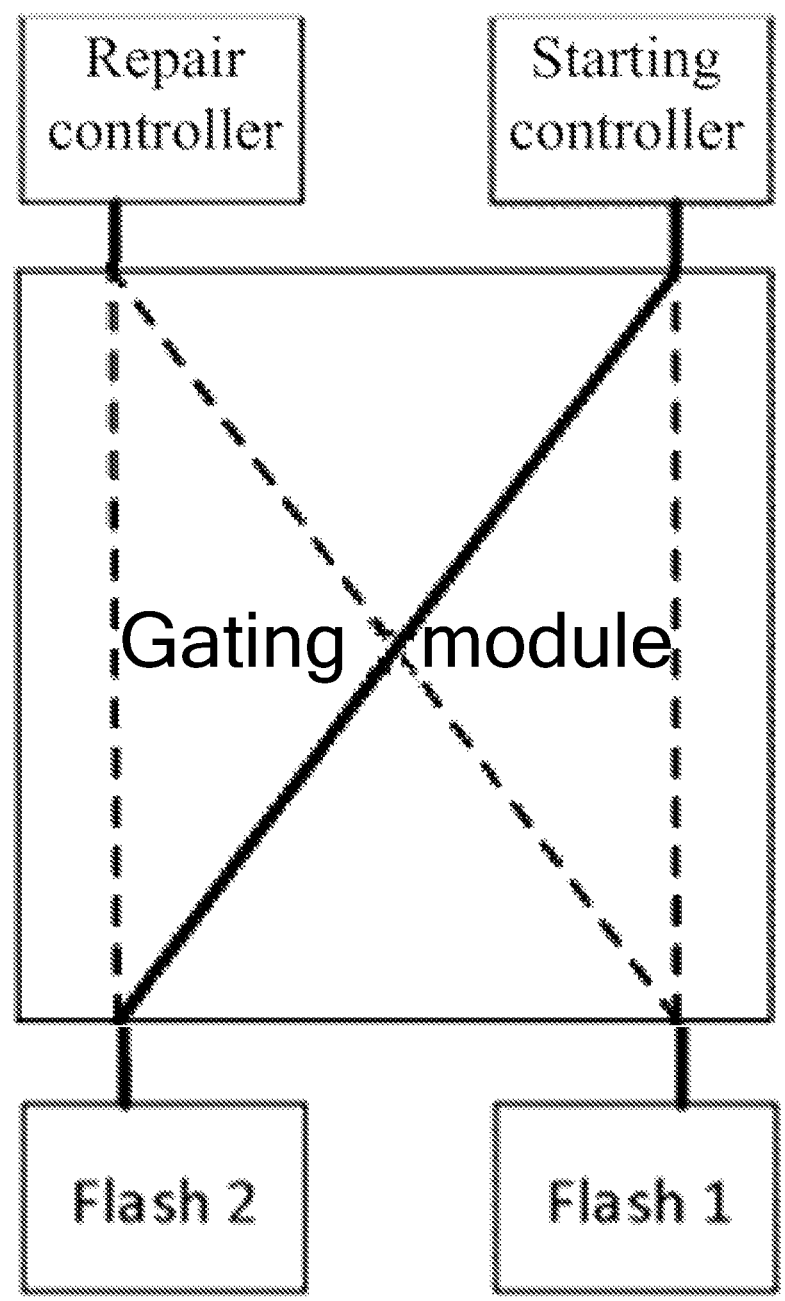
FIG. 6 is a schematic diagram of a fourth connection structure of the gating module according to an embodiment of the present application.
Figure 7:
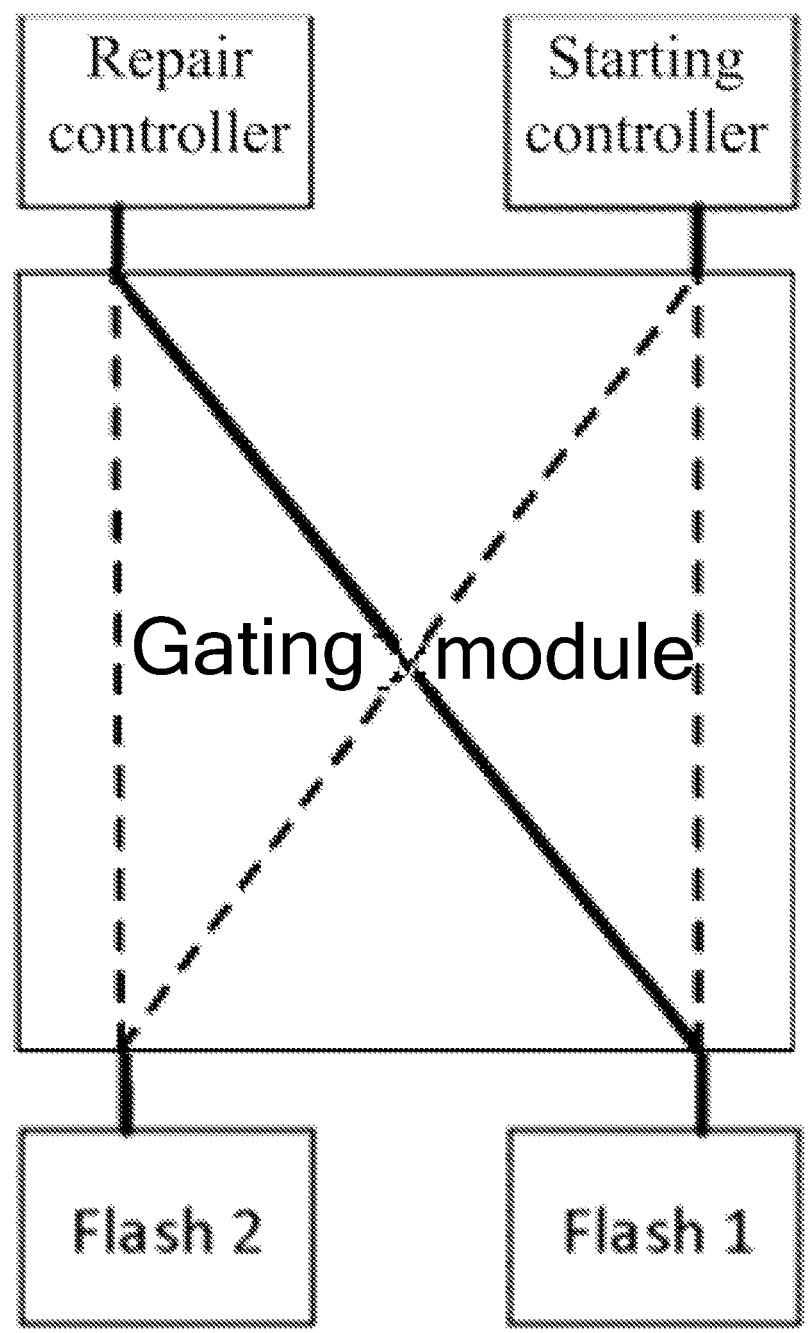
FIG. 7 is a schematic diagram of a fifth connection structure of the gating module according to an embodiment of the present application.
Figure 8:
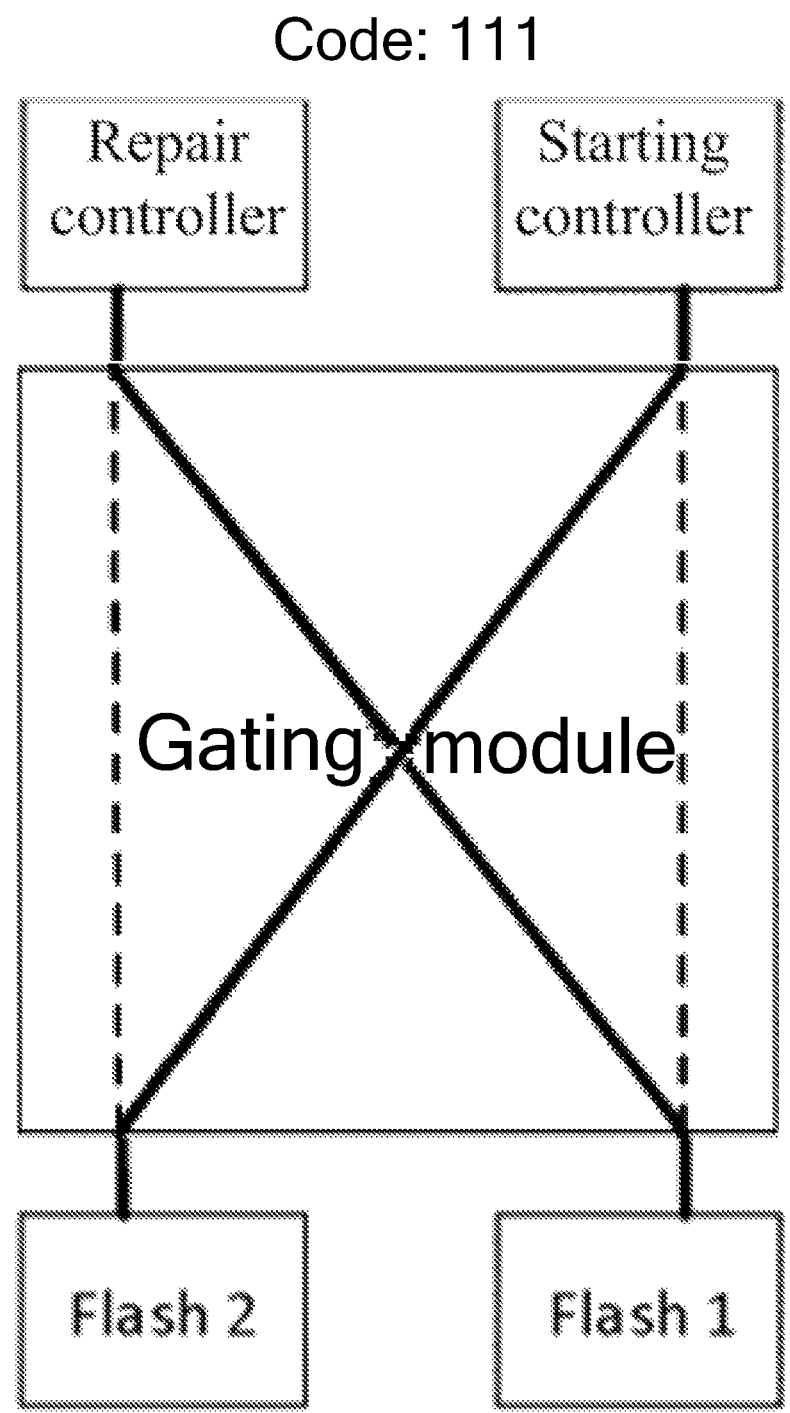
FIG. 8 is a schematic diagram of a sixth connection structure of the gating module according to an embodiment of the present application.

It should be noted that the gating module 42 of the present application does not gate two storage modules to the same controller simultaneously or gate the same storage module to two controllers simultaneously. In some embodiments, the gating module 42 includes two gating ends and two transmission ends. The first gating end is connected to the main storage module 11 (Flash 1). The second gating end is connected to the standby storage module 12 (Flash 2). The first transmission end is connected to the starting controller 2. The second transmission end is connected to the repair controller 3. Then the gating module 42 has six gating statuses (not including all disconnected statues): as shown in FIG. 3, the first gating end is connected with the first transmission end, and Flash 1 is connected to the starting controller; as shown in FIG. 4, the second gating end is connected with the second transmission end, and Flash 2 is connected to the repair controller; as shown in FIG. 5, the first gating end is connected with the first transmission end, Flash 1 is connected to the starting controller, the second gating end is connected with the second transmission end, and Flash 2 is connected to the repair controller; as shown in FIG. 6, the second gating end is connected with the first transmission end, and Flash 2 is connected to the starting controller; as shown in FIG. 7, the first gating end is connected with the second transmission end, and Flash 1 is connected to the repair controller; as shown in FIG. 8, the first gating end is connected with the second transmission end, Flash 1 is connected to the repair controller, the second gating end is connected with the first transmission end, and Flash 2 is connected to the starting controller. Both the two storage modules communicate with the connected controller using a serial peripheral interface (SPI) communication protocol.

Based on this, in the present application, the gating status of the gating module 42 may be represented in a coding manner so as to perform gating control on the gating module 42. For example, the connection of Flash 1 to the starting controller corresponds to code 001. The connection of Flash 2 to the repair controller corresponds to code 010. A forward full connection corresponds to code 011. The connection of Flash 2 to the starting controller corresponds to code 101. The connection of Flash 1 to the repair controller corresponds to code 110. A cross full connection corresponds to code 111.

In some embodiments, the logic controller 4 is further configured to determine that the standby storage module 12 starts abnormally if detecting that the starting controller 2 fails to restart the system after establishing a communication connection between the standby storage module 12 and the starting controller 2.

Accordingly, the repair controller 3 is configured to automatically perform the abnormality repair processing on the main storage module 11 when the main storage module 11 starts abnormally and the standby storage module 12 works normally, and sequentially perform the abnormality repair processing on the main storage module 11 and the standby storage module 12 when the main storage module 11 and the standby storage module 12 start abnormally.

Further, the logic controller 4 determines that the standby storage module 12 also starts abnormally if detecting that the starting controller 2 fails to restart the system after establishing a communication connection between the standby storage module 12 and the starting controller 2 whereby the starting controller 2 restarts the system. The repair controller 3 performs the abnormality repair processing on the storage module starting abnormally.

Based on the foregoing embodiments, in some embodiments, the logic controller 45 establishes a communication connection between the main storage module 11 and the starting controller 2 by default in the initial situation. The control module 45 sends a power key signal to the starting controller 2 via the detection module 41. The starting controller 2 reads, when establishing a communication connection with the main storage module 11, the ME firmware program from the main storage module 11 so as to run the ME, and generates the power-on starting status signal using the ME after receiving the power key signal. The detection module 41 judges whether the starting controller 2 sends the power-on starting status signal within the preset time. If the starting controller does not send the power-on starting status signal within the preset time, a status signal timeout result is sent to the control module 45. The control module 45 determines that the main storage module 11 starts abnormally after receiving the status signal timeout result, and records the starting abnormality situation and the starting abnormality reason (for example, status signal timeout) of the main storage module 11 to the status register 44. The control module 45 judges, according to the record of the status register 44, whether other storage module has an abnormality record, controls the gating module 42 to connect other storage module to the starting controller 2 to restart the system if the other storage module does not have the abnormality record, and indicates, if the other storage module has the abnormality record, that both the two storage modules have a starting abnormality problem.

If the repair controller 3 works normally, the repair controller 3 polls the status register 44 of the logic controller 4. When the repair controller 3 queries from the status register 44 that a storage module starts abnormally, the starting abnormality reason recorded in the status register 44 is read. If the reason is the status signal timeout, operation of fault locating and trying to repair will be performed: if it is queried in the status register 44 that only the main storage module 11 starts abnormally, it indicates that the standby storage module 12 is working normally currently, and a problem is to locate and repair the main storage module 11 and not affect the system working. The repair controller 3 switches the gating status of the gating module 42, and switches from a mode where the standby storage module 12 is connected to the starting controller 2 to a reverse full-connection mode (the standby storage module 12 is connected to the starting controller 2, the main storage module 11 is connected to the repair controller 3, it should be noted that during the mode switching, the standby storage module 12 is connected to the starting controller 2 without flashing, and the communication is not affected), whereby the main storage module 11 is repaired by the repair controller 3, and after the repair of the main storage module 11 is completed, the system is not restarted so as to avoid affecting the service. If it is queried in the status register 44 that two storage modules start abnormally, the repair controller 3 repairs the storage modules one by one. If the problem is a firmware problem, the repair controller tries to restart the system after the repair, and verifies whether the repair is successful.

If the repair controller 3 does not work normally, the repair work is performed by the logic controller 4, and the logic controller 4 will retry each storage module for multiple times (for example, 3 times) in turn to try to start up.

In some embodiments, the process of performing abnormality repair processing on the main storage module includes:

judging whether a power supply voltage of the main storage module is normal;

if the power supply voltage is abnormal, determining that a surrounding circuit of the main storage module is abnormal;

if the power supply voltage is normal, determining that the surrounding circuit of the main storage module is normal, and judging whether the main storage module is normally accessible;

if the main storage module is not normally accessible, determining that the main storage module is damaged;

if the main storage module is normally accessible, determining that the main storage module is normal, and judging whether the ME firmware program in the main storage module is readable;

if the ME firmware program is not readable, determining that the main storage module lacks the ME firmware program, rewriting a backed-up ME firmware program to the main storage module for automatic repair, and switching the main storage module back to reestablish a communication connection with the starting controller;

if the ME firmware program is readable, verifying the ME firmware program in the main storage module, if a verification fails, determining that the ME firmware program in the main storage module is damaged, rewriting the backed-up ME firmware program to the main storage module for automatic repair, and switching the main storage module back to reestablish a communication connection with the starting controller;

if the main storage module still starts abnormally, determining that the ME has a fault.

In some embodiments, the reason for the running abnormality of the ME of the starting controller (equivalent to the starting abnormality of the storage module) may be the abnormality of the storage module, the abnormality of the surrounding circuit of the storage module, lack of the ME firmware program in the storage module, damage to the ME firmware program in the storage module, and tfault of the ME, which results in that the starting controller cannot give the power-on starting status signal, and the system cannot enter a power-on mode. Based on this, the process of repairing the starting abnormality of the main storage module includes: 1) reading whether the power supply voltage of the main storage module is normal, and if the power supply voltage is normal, determining that the surrounding circuit of the main storage module is normal; if the power supply voltage is abnormal, determining that the surrounding circuit of the main storage module is abnormal, determining that a server mainboard has a fault, reporting an alarm, and clearly replacing the mainboard (hardware faults cannot automatically recover firmware); 2) if the power supply voltage is normal, accessing the main storage module; if the access is normal, determining that the main storage module is normal; if the main storage module is not accessible, determining that the main storage module is damaged and that the mainboard has a fault, reporting an alarm, and clearly replacing the mainboard; 3) if the main storage module is normal, judging whether an ME firmware program in the main storage module is readable; if the ME firmware program in the main storage module is not readable, recording the reason of this startup abnormality as the lack of the ME firmware program in the main storage module, rewriting the backed-up ME firmware program to the main storage module for automatic repair, and writing into the status register of the logic controller to indicate that the main storage module has been repaired; clearing the relevant abnormality record of the main storage module by the logic controller, and switching the main storage module back to reestablish a communication connection with the starting controller, skipping restarting to avoid affecting the service, and reporting to an operation and maintenance server, whereby operation and maintenance personnel decide whether to recover to the main storage module at the next restart; 4) if the ME firmware program in the main storage module is read, verifying the ME firmware program therein, calculating a relevant verification value, and comparing the verification value with a verification value of an ME firmware program backed up by the system; if the verification values are consistent, indicating that the comparison is passed, and determining that the ME firmware program in the main storage module is not damaged; if the verification values are inconsistent, indicating that the comparison fails, determining that the ME firmware program in the main storage module is damaged, rewriting the backed-up ME firmware program to the main storage module for automatic repair, and writing into the status register of the logic controller to indicate that the main storage module has been repaired; clearing the relevant abnormality record of the main storage module by the logic controller, and switching the main storage module back to reestablish a communication connection with the starting controller, skipping restarting to avoid affecting the service, and reporting to an operation and maintenance server, whereby operation and maintenance personnel decide whether to recover to the main storage module at the next restart; 5) if the main storage module still starts abnormally, determining that the ME has a fault, reporting an alarm, and replacing relevant components of the ME or replacing the mainboard.

In some embodiments, the process of sequentially performing abnormality repair processing on the main storage module and the standby storage module includes:

judging whether a power supply voltage of the main storage module is normal;

if the power supply voltage is abnormal, determining that a surrounding circuit of the main storage module is abnormal;

if the power supply voltage is normal, determining that the surrounding circuit of the main storage module is normal, and judging whether the main storage module is normally accessible;

if the main storage module is not normally accessible, determining that the main storage module is damaged;

if the main storage module is normally accessible, determining that the main storage module is normal, and judging whether the ME firmware program in the main storage module is readable;

if the ME firmware program is not readable, determining that the main storage module lacks the ME firmware program, rewriting the backed-up ME firmware program to the main storage module for automatic repair, controlling, after the writing is completed, the logic controller to switch the main storage module back to establish a communication connection with the starting controller, controlling the starting controller to restart the system, and judging whether the system is normally restartable; if the system is normally restartable, directly rewriting the backed-up ME firmware program to the standby storage module again, controlling, after the writing is completed, the logic controller to switch the standby storage module back to establish a communication connection with the starting controller, controlling the starting controller to restart the system, and judging whether the system is normally restartable; if the system is normally restartable, determining that the main storage module and the standby storage module have been repaired;

if the ME firmware program is readable, verifying the ME firmware program in the main storage module, if the verification fails, determining that the ME firmware program in the main storage module is damaged, rewriting the backed-up ME firmware program to the main storage module for automatic repair, controlling, after the writing is completed, the logic controller to switch the main storage module back to establish a communication connection with the starting controller, controlling the starting controller to restart the system, and judging whether the system is normally restartable; if the system is normally restartable, directly rewriting the backed-up ME firmware program to the standby storage module again, controlling, after the writing is completed, the logic controller to switch the standby storage module back to establish a communication connection with the starting controller, controlling the starting controller to restart the system, and judging whether the system is normally restartable; if the system is normally restartable, determining that the main storage module and the standby storage module have been repaired;

if the restarting of the system is abnormal, determining that the ME has a fault.

In some embodiments, the process of sequentially performing abnormality repair processing on the main storage module and the standby storage module includes: 1) reading whether the power supply voltage of the main storage module is normal, and if the power supply voltage is normal, determining that the surrounding circuit of the main storage module is normal; if the power supply voltage is abnormal, determining that the surrounding circuit of the main storage module is abnormal, determining that the server mainboard has a fault, reporting an alarm, and clearly replacing the mainboard (hardware faults cannot automatically recover firmware); 2) if the power supply voltage is normal, accessing the main storage module; if the access is normal, determining that the main storage module is normal; if the main storage module is not accessible, determining that the main storage module is damaged and that the mainboard has a fault, reporting an alarm, and clearly replacing the mainboard; 3) if the main storage module is normal, judging whether an ME firmware program in the main storage module is readable; if the ME firmware program in the main storage module is not readable, recording the reason of this startup abnormality as the lack of the ME firmware program in the main storage module, rewriting a backed-up ME firmware program to the main storage module for automatic repair, controlling, after the writing is completed, the logic controller to switch the main storage module back to establish a communication connection with the starting controller, controlling the starting controller to restart the system, and judging whether the system is normally restartable; if the system is normally restartable, directly rewriting a backed-up ME firmware program to the standby storage module again, controlling, after the writing is completed, the logic controller to switch the standby storage module back to establish a communication connection with the starting controller, controlling the starting controller to restart the system, and judging whether the system is normally restartable; if the system is normally restartable, determining that the main storage module and the standby storage module have been repaired, and writing into the status register of the logic controller to indicate that the main storage module and the standby storage module have been repaired; clearing relevant abnormality records of the main storage module and the standby storage module by the logic controller, and switching the main storage module back to reestablish a communication connection with the starting controller; restarting the system while reporting to an operation and maintenance server, thereby completing automatic firmware recovery; 4) if an ME firmware program in the main storage module is read, verifying the ME firmware program therein, calculating a relevant verification value, and comparing the verification value with a verification value of an ME firmware program backed up by the system; if the verification values are consistent, indicating that the comparison is passed, and determining that the ME firmware program in the main storage module is not damaged; if the verification values are inconsistent, indicating that the comparison fails, determining that the ME firmware program in the main storage module is damaged, rewriting the backed-up ME firmware program to the main storage module for automatic repair, controlling, after the writing is completed, the logic controller to switch the main storage module back to establish a communication connection with the starting controller, controlling the starting controller to restart the system, and judging whether the system is normally restartable; if the system is normally restartable, directly rewriting a backed-up ME firmware program to the standby storage module again, controlling, after the writing is completed, the logic controller to switch the standby storage module back to establish a communication connection with the starting controller, controlling the starting controller to restart the system, and judging whether the system is normally restartable; if the system is normally restartable, determining that the main storage module and the standby storage module have been repaired, and writing into the status register of the logic controller to indicate that the main storage module and the standby storage module have been repaired; clearing relevant abnormality records of the main storage module and the standby storage module by the logic controller, and switching the main storage module back to reestablish a communication connection with the starting controller; restarting the system while reporting to an operation and maintenance server, thereby completing automatic firmware recovery; 5) if the restarting of the system is abnormal, determining that the ME has a fault, reporting an alarm, and replacing relevant components of the ME or replacing the mainboard.

In some embodiments, the system firmware program further includes a BIOS firmware program, and the starting controller 2 is connected to the repair controller 3.

The starting controller 2 is further configured to read, after the system power-on is completed, the BIOS firmware program from the storage module to start a BIOS.

The repair controller 3 is further configured to perform BIOS starting abnormality judgment when the starting controller 2 starts the BIOS, and automatically perform BIOS firmware program abnormality repair processing on the storage module when the BIOS starts abnormally due to a problem in the BIOS firmware program.

Further, the system firmware program of the present application further includes a BIOS firmware program, and the starting controller 2 is also connected to the repair controller 3. The working principle thereof is:

The repair controller 3 performs BIOS starting abnormality judgment when the starting controller 2 starts the BIOS, and automatically performs BIOS firmware program abnormality repair processing (which is similar to the principle of abnormality repair processing for the ME firmware program, and will not be described in detail herein) on the storage module when the BIOS starts abnormally due to a problem in the BIOS firmware program.

In some embodiments, the starting controller 2 is a CPU, the repair controller 3 is a BMC, and the logic controller 4 is a CPLD.

In some embodiments, a server of an old version includes a platform controller hub (PCH), and an ME is integrated in the PCH. In a server of a new version, a PCH is eliminated, functions of the PCH are integrated in a CPU, and an ME is also disposed in the CPU.

The starting controller 2 of the present application adopts a CPU, the repair controller 3 adopts a BMC, and the logic controller 4 adopts a CPLD.

Furthermore, in the present application, a current gating status of the gating module, a certain storage module currently used for starting the system, the statuses of two storage modules, and the like are visually displayed on a web page, and a user manually switches the configuration of a certain storage module used for starting, and manually switches the function such as the gating status of the gating module. The user may also remotely query, via a BMC, an application programming interface (API) command such as a current gating status of the gating module, a certain storage module currently used for starting the system, or the statuses of two storage modules, the user manually switches the storage modules used for starting, and manually switches the API command such as the gating status of the gating module.

The present application also provides a server, including the server firmware self-recovery system according to any of the foregoing.

For the description of the server provided herein, reference may be made to the embodiments of the foregoing firmware self-recovery system. Details are not described again in the present application.

It should also be noted that relational terms such as first and second in the present description are used solely to distinguish one entity or operation from another entity or operation without necessarily requiring or implying any actual such relationship or order between such entities or operations. Moreover, the terms "include", "contain", or any other variations thereof are intended to cover a non-exclusive inclusion, such that a process, method, article, or device including a series of elements not only includes those elements, but also includes other elements that are not explicitly listed, or also includes elements inherent to such process, method, article, or device. It is not excluded, without more constraints, that additional identical elements exist in the process, method, article, or device including elements defined by a sentence "including a . . . ".

The foregoing description of the disclosed embodiments is provided to enable those skilled in the art to implement or use the present application. Various modifications to these embodiments will be readily apparent to those skilled in the art, and the general principles defined herein may be implemented in other embodiments without departing from the spirit or scope of the present application. Therefore, the present application will not be limited to these embodiments shown herein but is to be accorded the broadest scope consistent with the principles and novel features disclosed herein.

The invention claimed is:

1. A server firmware self-recovery system, comprising:
a storage module, configured to store a system firmware program;
a starting controller, configured to read, when establishing a first communication connection with the storage module, the system firmware program from the storage module so as to start a system;
a repair controller, configured to automatically perform abnormality repair processing on the storage module when the storage module starts abnormally and the repair controller establishes a second communication connection with the storage module; and
a logic controller, connected to the storage module, the starting controller and the repair controller respectively, and configured to establish the first communication connection between the storage module and the starting controller by default in an initial situation, determine that the storage module starts abnormally in response to detecting that the starting controller fails to start the system, and switch the storage module to establish the second communication connection with the repair controller;
wherein the starting controller comprises a management engine (ME), and the system firmware program comprises an ME firmware program;
wherein the starting controller is configured to read, when establishing the first communication connection with the storage module, the ME firmware program from the storage module so as to run the ME, and generate a power-on starting status signal using the ME after receiving a power key signal;
wherein the logic controller is configured to receive the power key signal of the system and send the power key signal to the starting controller, judge whether the power-on starting status signal returned by the starting controller is received within a preset time, control system hardware to be powered on so as to start the system in response to a judgment that the power-on starting status signal is received within the preset time, determine that the storage module starts abnormally in response to a judgment that the power-on starting status signal is not received within the preset time, and switch the storage module to establish the second communication connection with the repair controller;
wherein the logic controller comprises:
a detection module connected to the starting controller, configured to send a status signal timeout result to a control module when the power-on starting status signal returned by the starting controller is not received within the preset time after the power key signal is sent to the starting controller;
a gating module comprising a first gating end connected to the storage module, a first transmission end connected to the starting controller, and a second transmission end connected to the repair controller;
a second communication module connected to a first communication module in the repair controller; and
a status register connected to the second communication module;
wherein the control module is connected to the detection module, the second communication module, the status register, and the gating module respectively, and is configured to control the gating module to connect the first gating end with the first transmission end by default in the initial situation, determine that the storage module starts abnormally after receiving the status signal timeout result, and record a starting abnormality situation and reason of the storage module to the status register; and
wherein the repair controller is further configured to poll the status register through a third communication module, and control the gating module to switch the first gating end to be connected with the second transmission end through communication with the control module when the starting abnormality situation of the storage module is queried, so as to automatically perform the abnormality repair processing on the storage module based on a queried starting abnormality reason of the storage module.

2. The server firmware self-recovery system according to claim 1, wherein the logic controller further comprises:
a status memory module connected to the control module, configured to store a latest gating status of the gating module, wherein a gating status of the gating module initially defaulted by the status memory module is that the first gating end is connected with the first transmission end; and
wherein the control module is further configured to read a last gating status of the gating module from the status memory module after a system alternating current (AC) is powered on and the control module starts to work, and control the gating module to maintain the last gating status.

3. The server firmware self-recovery system according to claim 1, wherein the storage module comprises a main storage module and a standby storage module both storing the system firmware program;
wherein the logic controller is configured to establish a third communication connection between the main storage module and the starting controller by default in the initial situation, determine that the main storage module starts abnormally in response to detecting that the starting controller fails to start the system, switch the main storage module to establish a fourth communication connection with the repair controller, and establish a fifth communication connection between the standby storage module and the starting controller, whereby the starting controller restarts the system.

4. The server firmware self-recovery system according to claim 3, wherein the logic controller is further configured to determine that the standby storage module starts abnormally in response to detecting that the starting controller fails to restart the system after establishing the fifth communication connection between the standby storage module and the starting controller;
  wherein the repair controller is configured to automatically perform the abnormality repair processing on the main storage module when the main storage module starts abnormally and the standby storage module works normally, and sequentially perform the abnormality repair processing on the main storage module and the standby storage module when the main storage module and the standby storage module start abnormally.

5. The server firmware self-recovery system according to claim 4, wherein a process of the performing the abnormality repair processing on the main storage module comprises:
  judging whether a power supply voltage of the main storage module is normal;
  in response to a judgment that the power supply voltage is abnormal, determining that a circuit of the main storage module is abnormal, and reporting an alarm to replace a mainboard; and
  in response to a judgment that the power supply voltage is normal, determining that the circuit of the main storage module is normal.

6. The server firmware self-recovery system according to claim 4, wherein a process of the sequentially performing the abnormality repair processing on the main storage module and the standby storage module comprises:
  judging whether a power supply voltage of the main storage module is normal;
  in response to a judgment that the power supply voltage is abnormal, determining that a circuit of the main storage module is abnormal;
  in response to a judgment that the power supply voltage is normal, determining that the circuit of the main storage module is normal, and judging whether the main storage module is normally accessible;
  in response to a judgment that the main storage module is not normally accessible, determining that the main storage module is damaged; and
  in response to a judgment that the main storage module is normally accessible, determining that the main storage module is normal.

7. The server firmware self-recovery system according to claim 1, wherein the system firmware program further comprises a basic input output system (BIOS) firmware program; and the starting controller is connected to the repair controller;
  wherein the starting controller is further configured to read, after a system power-on is completed, the BIOS firmware program from the storage module to start a BIOS; and
  wherein the repair controller is further configured to perform BIOS starting abnormality judgment when the starting controller starts the BIOS, and automatically perform BIOS firmware program abnormality repair processing on the storage module when the BIOS starts abnormally due to a problem in the BIOS firmware program.

8. The server firmware self-recovery system according to claim 1, wherein the starting controller is a central processing unit (CPU), the repair controller is a baseboard management controller (BMC), and the logic controller is a complex programmable logic device (CPLD).

9. A server, comprising a server firmware self-recovery system, wherein the server firmware self-recovery system comprises:
  a storage module, configured to store a system firmware program;
  a starting controller, configured to read, when establishing a first communication connection with the storage module, the system firmware program from the storage module so as to start a system;
  a repair controller, configured to automatically perform abnormality repair processing on the storage module when the storage module starts abnormally and the repair controller establishes a second communication connection with the storage module; and
  a logic controller, connected to the storage module, the starting controller and the repair controller respectively, and configured to establish the first communication connection between the storage module and the starting controller by default in an initial situation, determine that the storage module starts abnormally in response to detecting that the starting controller fails to start the system, and switch the storage module to establish the second communication connection with the repair controller;
  wherein the starting controller comprises a management engine (ME), and the system firmware program comprises an ME firmware program;
  wherein the starting controller is configured to read, when establishing the first communication connection with the storage module, the ME firmware program from the storage module so as to run the ME, and generate a power-on starting status signal using the ME after receiving a power key signal;
  wherein the logic controller is configured to receive the power key signal of the system and send the power key signal to the starting controller, judge whether the power-on starting status signal returned by the starting controller is received within a preset time, control system hardware to be powered on so as to start the system in response to a judgment that the power-on starting status signal is received within the preset time, determine that the storage module starts abnormally in response to a judgment that the power-on starting status signal is not received within the preset time, and switch the storage module to establish the second communication connection with the repair controller;
  wherein the logic controller comprises:
    a detection module connected to the starting controller, configured to send a status signal timeout result to a control module when the power-on starting status signal returned by the starting controller is not received within the preset time after the power key signal is sent to the starting controller;
    a gating module comprising a first gating end connected to the storage module, a first transmission end connected to the starting controller, and a second transmission end connected to the repair controller;
    a second communication module connected to a first communication module in the repair controller; and
    a status register connected to the second communication module;
  wherein the control module is connected to the detection module, the second communication module, the status register, and the gating module respectively, and is configured to control the gating module to connect the first gating end with the first transmission end by default in the initial situation, determine that the storage module starts abnormally after receiving the status signal timeout result, and record a starting abnormality situation and reason of the storage module to the status register; and wherein the repair controller is further configured to poll the status register through a third communication module, and control the gating module to switch the first gating end to be connected with the second transmission end through communication with the control module when the starting abnormality situation of the storage module is queried, so as to automatically perform the abnormality repair processing on the storage module based on a queried starting abnormality reason of the storage module.

10. The server firmware self-recovery system according to claim 2, wherein the status memory module is connected to the second communication module to make the repair controller query the latest gating status of the gating module.

11. The server firmware self-recovery system according to claim 2, wherein the gating status of the gating module is represented in a coding manner, wherein a first code represents a first gating status where a main storage module of the storage module is connected to the starting controller;

a second code represents a second gating status where a standby storage module of the storage module is connected to the repair controller;

a third code represents a third gating status where the standby storage module is connected to the repair controller, and the main storage module is connected to the starting controller;

a fourth code represents a fourth gating status where the standby storage module is connected to the starting controller;

a fifth code represents a fifth gating status where the main storage module is connected to the repair controller; and a sixth code represents a sixth gating status where the standby storage module is connected to the starting controller, and the main storage module is connected to the repair controller.

12. The server firmware self-recovery system according to claim 1, wherein the storage module communicates with the starting controller and the repair controller by a serial peripheral interface communication protocol.

13. The server firmware self-recovery system according to claim 5, wherein after the repair controller is configured to determine that the circuit of the main storage module is normal, the repair controller is further configured to:

judge whether the main storage module is normally accessible;

in response to a judgment that the main storage module is not normally accessible, determine that the main storage module is damaged, and report the alarm to replace the mainboard; and in response to a judgment that the main storage module is normally accessible, determine that the main storage module is normal.

14. The server firmware self-recovery system according to claim 13, wherein after the repair controller is configured to determine that the main storage module is normal, the repair controller is further configured to:

judge whether the ME firmware program in the main storage module is readable; and in response to a judgment that the ME firmware program is not readable, determining that the main storage module lacks the ME firmware program, rewriting a backed-up ME firmware program to the main storage module for automatic repair, and switching the main storage module back to reestablish the third communication connection with the starting controller.

15. The server firmware self-recovery system according to claim 14, wherein after the repair controller is configured to judge whether the ME firmware program in the main storage module is readable, the repair controller is further configured to:

in response to a judgment that the ME firmware program is readable, verify the ME firmware program in the main storage module;

in response to a determination that a verification fails, determine that the ME firmware program in the main storage module is damaged, rewrite the backed-up ME firmware program to the main storage module for the automatic repair, and switch the main storage module back to reestablish the third communication connection with the starting controller; and in response to a judgment that the main storage module still starts abnormally, determine that the ME has a fault.

16. The server firmware self-recovery system according to claim 6, wherein after the repair controller is configured to determine that the main storage module is normal, the repair controller is further configured to:

judge whether the ME firmware program in the main storage module is readable; and in response to a judgment that the ME firmware program is not readable, determine that the main storage module lacks the ME firmware program, rewrite a backed-up ME firmware program to the main storage module for automatic repair, and control, after a writing is completed, the logic controller to switch the main storage module back to establish the third communication connection with the starting controller.

17. The server firmware self-recovery system according to claim 16, wherein after the repair controller is configured to control, after the writing is completed, the logic controller to switch the main storage module back to establish the third communication connection with the starting controller, the repair controller is further configured to:

control the starting controller to restart the system, and judge whether the system is normally restartable;

in response to a judgment that the system is normally restartable, directly rewrite the backed- up ME firmware program to the standby storage module again, control, after the writing is completed, the logic controller to switch the standby storage module back to establish the fifth communication connection with the starting controller, control the starting controller to restart the system, and judge whether the system is normally restartable; and in response to a judgment that the system is normally restartable, determining that the main storage module and the standby storage module have been repaired.

18. The server firmware self-recovery system according to claim 16, wherein after the repair controller is configured to judge whether the ME firmware program in the main storage module is readable, the repair controller is further configured to:

in response to a judgment that the ME firmware program is readable, verify the ME firmware program in the main storage module, in response to a determination that a verification fails, determine that the ME firmware program in the main storage module is damaged, rewrite the backed-up ME firmware program to the main storage module for the automatic repair, control, after the writing is completed, the logic controller to switch the main storage module back to establish the third communication connection with the starting controller, control the starting controller to restart the system, and judge whether the system is normally restartable;

in response to a judgment that the system is normally restartable, directly rewrite the backed-up ME firmware program to the standby storage module again, control, after the writing is completed, the logic controller to switch the standby storage module back to establish the fifth communication connection with the starting controller, control the starting controller to restart the system, and judge whether the system is normally restartable;

in response to a judgment that the system is normally restartable, determine that the main storage module and the standby storage module have been repaired; and in response to a judgment that the restarting of the system is abnormal, determine that the ME has a fault.

* * * * *